United States Patent [19]

Yamamoto et al.

[11] Patent Number: 5,422,133
[45] Date of Patent: Jun. 6, 1995

[54] EDIBLE MATERIAL

[75] Inventors: Iwao Yamamoto; Yamamoto Norihiko, both of Tsuruga; Yoshito Sugino, Sakujimachi, all of Japan

[73] Assignee: Sugiyo Co., Ltd., Ishikawa, Japan

[21] Appl. No.: 79,750

[22] Filed: Jun. 22, 1993

[30] Foreign Application Priority Data

Jun. 25, 1992 [JP] Japan .................................. 4-209398

[51] Int. Cl.$^6$ ..................... A23L 1/0528; A23L 1/325
[52] U.S. Cl. .................................. 426/573; 426/574; 426/643; 426/658
[58] Field of Search ............... 426/643, 573, 574, 575, 426/578, 658, 804

[56] References Cited

U.S. PATENT DOCUMENTS

| | | | |
|---|---|---|---|
| 4,362,752 | 12/1982 | Sugino et al. | 426/574 |
| 4,676,976 | 6/1987 | Toba et al. | 426/573 |
| 4,978,551 | 12/1990 | Sugino | 426/573 |
| 5,173,321 | 12/1992 | Hosogoe et al. | 426/578 |

*Primary Examiner*—Jeanette Hunter
*Attorney, Agent, or Firm*—Banner, Birch, McKie & Beckett

[57] ABSTRACT

An edible material comprising partially gelled mannan paste prepared by adding an alkali to a mass of mannan paste to cause gelation thereof to proceed, and adding an acid to said mannan paste thereby to suppress the gelation of said mannan paste. The material has a high degree of affinity for fish meat protein paste or gel.

9 Claims, No Drawings

EDIBLE MATERIAL

BACKGROUND OF THE INVENTION

This invention relates to an improved edible material and, more particularly, an edible material comprising partially gelled, hydrophilic mannan paste having a high degree of affinity for mashed or kneaded fish meat paste, and a method of producing the edible material.

It is well known that the mannan gel formed by adding an alkali to mannan paste is quite similar in texture, flexibility and elasticity to foodstuffs made of fish meat paste, and gives an oral sensation similar to that experienced when such foodstuffs are eaten. In the fish meat paste product industry, various studies and experiments have been made to improve the texture of fish meat paste products by mixing fish meat paste with mannan paste or mannan gel.

As is well known, the mannan gel formed by adding an alkali to mannan paste has completely lost solubility in water and become a tough gell without affinity for water. Therefore, if such tough mannan gel is mixed with fish meat paste and kneaded into a mixed paste, which is coagulated by heating, the product would have a jelly strength lower than those of fish meat paste products which do not contain mannan gel. This is believed to be because particles of mannan gel having no affinity whatsoever for fish meat paste are merely dispersed in fish meat paste or even destroy the reticular structure of the coagulated fish meat paste product.

On the other hand, the fish meat paste product formed by mixing fish meat paste with mannan paste and an alkali, kneading the mixture to produce uniform paste and coagulating the paste by heat has a reduced jelly strength. The reason for this is believed to be as follows: since the conditions such as temperature, time, pH, etc. for gelation of fish meat paste differ from those for gelation of mannan paste, when a mixed mass of fish meat paste and mannan paste is heated, the two kinds of paste in the mass form different layers of gel which do not possess affinity for each other, so that when an exterior force is applied to the mass, the layers are likely to be displaced relative to each other with resulting reduction of the jelly strength of the mass.

Another problem is that heating foodstuff containing protein as a chief component with alkali added thereto deteriorates the taste of the food.

There have been proposed no mannan gels having affinity for fish meat paste, nor suitable methods of effectively preventing the jelly strength of food products of fish meat paste from decreasing due to addition of mannan to the paste.

Based on the understanding that the reduction of the jelly strength of food products of fish meat paste containing mannan gel is caused by lack of mutual affinity between mannan gel and fish meat protein gel, the present inventors have conducted various studies and experiments in an effort to improve mutual affinity between the two kinds of gel and found out that by adding an acid to mannan paste in the course of gelation so as to neutralize the alkali added to the paste as a gelling agent thereby to suppress or prevent the gelation from proceeding further, and adjusting the pH of the paste within a particular range, it is possible to produce a partially gelled, hydrophilic mannan paste having a desired jelly strength.

SUMMARY OF THE INVENTION

In accordance with the invention, there is provided an edible material comprising partially gelled mannan paste having affinity for fish meat protein gel and a method of preparing the edible material. The method comprises: adding an alkali to mannan dissolved in water, kneading the solution or paste of mannan for gelation of the mannan, and then adding an acid to the mannan paste undergoing gelation to neutralize the alkali thereby to suppress the gellation and form a partially gelled, hydrophilic mannan paste.

Mannan powder commercially available for making devil's tongue jelly or "konnyaku" in Japanese can be used as raw material for producing the edible material of the invention. It is also possible to use refined mannan powder prepared by adding an organic solvent such as alcohol to a water solution of mannan powder to cause components of the mannan having relatively high molecular weights to precipitate and drying the precipitate to obtain mannan powder from which components of lower molecular weights have been removed.

In the first step of soaking mannan powder with water to prepare mannan paste, there is no particular limit to the amount of mannan powder to be put into water. In view of workability, the viscosity of fish meat paste and other factors, however, the amount of mannan powder to be added is preferably 1.5 to 3.5% by weight of water.

Any known method of dissolving mannan powder in water may be employed. For example, mannan powder is put little by little into water kept at about 40° C. and being stirred violently so as to be dispersed in the water, and the water solution of mannan is kept being stirred for 30 to 60 minutes more and then left as it is for 6 to 16 hours, whereupon viscous mannan paste is obtained.

In the second step of causing the mannan paste obtained in the first step to gel, an alkali such as calcium hydroxide is added to the mannan paste. The amount of an alkali to be added can be the amount usually used in making devil's tongue jelly or "konnyaku", that is, about 1.5 to 3.5% by weight of the amount of mannan powder. If the mannan paste to which the alkali has been added is left as it is or heated, the mannan would completely lose its solubility in water and become solid gel without affinity for water. With less than 1.5% by weight of alkali added, the speed of gelation would be greatly reduced even if it was heated later, so that when mannan paste is mixed with fish meat paste and the mixture is heated, the great difference in the speed of gelation between the two kinds of paste would make it impossible to produce a food product of fish meat paste and mannan thoroughly mixed into an incorporate mass.

On the other hand, with more than 3.5% by weight of alkali added, the speed of gelation would be so fast that gelation of the whole mannan is completed before the next step of the process is entered. Therefore, the amount of alkali to be added is between 1.5 and 3.5% by weight of the amount of mannan powder.

The alkali to be added may be dissolved or dispersed in a suitable amount of water, and the solution may be mixed uniformly with the mannan paste.

In the third step, which is the most important one of the steps of the process, when the mannan paste has attained a required level of jelly strength as the gelation initiated by the addition of alkali to the paste proceeds, a neutralizing agent is added to the mannan paste thereby to strongly suppress or lower the speed of gelation, so that a mass of partially gelled, hydrophilic mannan paste is obtained.

Since the partially gelled mannan paste has a required jelly strength and remains hydrophilic, a mixture of the mannan paste and a different foodstuff such as fish meat paste will result in a completely uniform paste, and when heated, gelation of the fish meat paste and further gelation of the partially gelled mannan paste proceed in parallel till an incorporate mass of fish meat gel and mannan gel is formed.

As the neutralizing agent inorganic acids such as hydrochloric acid, sulfuric acid, phosphoric acid, etc. or organic acids such as acetic acid, gluconic acid, fumaric acid, malic acid, citric acid, etc. can be used. With an inorganic acid or a monobasic acid such as acetic acid or gluconic acid used as the neutralizing agent, the final product has a relatively low level of jelly strength while with citric acid the final product has a relatively high level of jelly strength.

The amount of the neutralizing agent to be added is adjusted in accordance with the pH the mannan paste is to be adjusted to. For experiment seven masses of mannan paste were prepared, to each of which an alkali was added and the mixture was sufficiently stirred for 5 to 20 minutes to cause gelation of the paste to proceed uniformly. A water solution of a neutralizing agent was added to each of the specimens undergoing gelation so that the specimens had different values of pH between 11.1 to 5.0. When the specimen having a pH value adjusted above 10.0 was left for 5 hours, gelation had advanced so that when heated the mass became solid hydrophobic gel. This is not the partially gelled mannan paste the invention is intended to produce.

On the contrary, the specimen having a pH value adjusted below 5.0 remained as a paste it was easy to knead after it was left for 24 hours., and the pasty condition remained unchanged even when it was heated. This is not the material the invention is interested in, either.

The jelly strength of the mannan paste increases as time passes after addition of an alkali to the paste. The specimen to which a neutralizing agent was added within 5 minutes after addition of an alkali thereto had a relatively low jelly strength after it was heated. The specimen to which a neutralizing agent was added more than 25 minutes after addition of an alkali thereto became gel 24 hours later even before it was heated.

Consequently, the range of pH within which the mannan paste undergoing gelation should be kept by addition of a neutralizing agent thereto should be between 5.0 and 9.5, and the time a neutralizing agent is to be added to the gelling mannan paste should be between 5 to 25 minutes after addition of an alkali thereto.

DESCRIPTION OF EXAMPLES

The invention will be described further by way of the following examples.

EXAMPLE 1

250 g of devil's tongue (or "konnyaku") mannan was added to 10 kg of water at 50° C. and stirred violently for the mannan to be sufficiently soaked with water. When the water solution of the mannan became viscous, the stirring was stopped, and the viscous solution was left as it was for 16 hours, whereupon a mass of uniform mannan paste was obtained. From the mass 1 kg of paste was taken and divided into two equal parts or specimens, to each of which 0.75 g of calcium hydroxide dissolved in 50 g of water was added. Upon lapse of 5 minutes after addition of the water solution of calcium hydroxide to the specimens, a water solution of 10% citric acid prepared beforehand was added to each of the specimens to adjust the pH value thereof to 11.1. The specimens will be referred to as No. 1 and No. 1', respectively. In the same manner, 14 specimens were prepared, of which specimens No. 2 and No. 2' had a pH of 10.0, specimens No. 3 and 3' had a pH of 9.2, specimens No. 4 and No. 4' had a pH of 8.1, specimens No. 5 and No. 5' had a pH of 7.3, specimens No. 6 and No. 6' had a pH of 6.0, and specimens No. 7 and No. 7' had a pH of 5.0.

Table 1 shows the conditions of those specimens 5 and 24 hours after adjustment of the pH thereof, and also the conditions of the specimens heated at 90° C. for 20 minutes upon lapse of 5 and 24 hours after the pH adjustment thereof.

TABLE 1

| Specimen No. | Amount of Ca(OH)$_2$ added (% by weight) | pH | Jelly strength (g·cm) | Condition |
|---|---|---|---|---|
| Condition 5 hours after pH adjustment ||||| 
| 1 | 3 | 11.1 | 83 | Gel like "konnyaku" |
| 2 | 3 | 10.0 | 62 | Gel like "konnyaku" |
| 3 | 3 | 9.2 | 15 | Paste like soft rice cake |
| 4 | 3 | 8.1 | 12 | Paste having low viscosity |
| 5 | 3 | 7.3 | 12 | Paste having low viscosity |
| 6 | 3 | 6.0 | 11 | Paste having low viscosity |
| 7 | 3 | 5.0 | 5 | Paste |
| Condition 24 hours after pH adjustment |||||
| 1' | 3 | 11.1 | 98 | Gel like "konnyaku" |
| 2' | 3 | 10.0 | 83 | Gel like "konnyaku" |
| 3' | 3 | 9.2 | 30 | Paste like soft rice cake |
| 4' | 3 | 8.1 | 12 | Paste having low viscosity |
| 5' | 3 | 7.3 | 12 | Paste having low viscosity |
| 6' | 3 | 6.0 | 11 | Paste having low viscosity |
| 7' | 3 | 5.0 | 5 | Paste |
| Condition when steamed 5 hours after pH adjustment |||||
| 1 | 3 | 11.1 | 302 | Gel like "konnyaku" |
| 2 | 3 | 10.0 | 294 | Gel like "konnyaku" |
| 3 | 3 | 9.2 | 186 | Gel like "konnyaku" |
| 4 | 3 | 8.1 | 116 | Gel like "konnyaku" |
| 5 | 3 | 7.3 | 48 | Gel like soft "konnyaku" |
| 6 | 3 | 6.0 | 36 | Gel like soft "konnyaku" |
| 7 | 3 | 5.0 | 10 | Paste |
| Condition when steamed 24 hours after pH adjustment |||||
| 1' | 3 | 11.1 | 320 | Gel like "konnyaku" |
| 2' | 3 | 10.0 | 314 | Gel like "konnyaku" |
| 3' | 3 | 9.2 | 208 | Gel like "konnyaku" |
| 4' | 3 | 8.1 | 81 | Gel like soft "konnyaku" |
| 5' | 3 | 7.3 | 45 | Gel like soft "konnyaku" |
| 6' | 3 | 6.0 | 37 | Gel like soft "konnyaku" |
| 7' | 3 | 5.0 | 11 | Paste |

EXAMPLE 2

100 g of potato starch was added to 1 kg of mannan paste prepared in the same manner as in EXAMPLE 1, and the pH of the mixture was adjusted to 8.1 in the same manner as in EXAMPLE 1. The partially gelled, hydrophilic mannan paste containing potato starch was heated at 90° C. for 20 minutes for further gelation to produce a foodstuff which gave an oral sensation similar to that experienced when "warabimochi" jelly was eaten.

EXAMPLE 3

The same manner as in EXAMPLE 2 was followed except that the amount of potato starch was 80 g and that 150 g of dried white of egg was added to the paste. A mass of jelly was obtained, which cut cleanly with a spoon and gave a good oral sensation when eaten.

EXAMPLE 4

Fish meat paste was prepared by mixing and kneading 100 g of mashed fish meat, 2.9 g of salt and 40 g of ice water. 30 g of partially gelled mannan paste prepared in EXAMPLE 1 and having a pH of 8.1, 8 g of potato starch and 1.4 g of a seasoning were added to the fish meat paste, and the mixture was thoroughly kneaded. The material obtained was molded around a core rod, steamed for coagulation and grilled to brown the outer surface layer of the material. The product obtained, "chikuwa" in Japanese, was of good quality with a jelly strength of about 500.

Thus, in accordance with the invention, it is possible to obtain partially gelled mannan paste which has a desired jelly strength and a high degree of affinity for fish meat protein paste or gel.

What we claim is:

1. A method of preparing a partially gelled, hydrophilic mannan paste, comprising the steps of:
    preparing a mass of mannan paste;
    adding an alkali to said mannan paste to cause gelation thereof to proceed; and
    adding a neutralizing agent to said mannan paste while said gelation is proceeding so as to adjust the pH of said paste between 5.0 and 9.5 and suppress the gelation of said mannan paste thereby to produce a mass of partially gelled, hydrophilic mannan paste.

2. The method of claim 1, wherein said mannan is obtained from powdered "konnyaku" or devil's tongue powder.

3. The method of claim 1, wherein said alkali is calcium hydroxide.

4. The method of claim 1, wherein said neutralizing agent is selected from a group consisting of inorganic acids such as hydrochloric acid, sulfuric acid and phosphoric acid, and organic acids such as acetic acid, gluconic acid, fumaric acid, malic acid and citric acid.

5. An edible material comprising partially gelled, hydrophilic mannan paste prepared by adding an alkali to a mass of mannan paste to cause gelation thereof to proceed, and adding an acid to said mannan paste while gelation is proceeding to suppress the gelation of said mannan paste.

6. The edible material of claim 5, wherein said mannan is obtained from powdered "konnyaku" or devil's tongue powder.

7. The edible material of claim 5, wherein said alkali is calcium hydroxide.

8. The edible material of claim 5, wherein said acid is selected from a group consisting of inorganic acids such as hydrochloric acid, sulfuric acid and phosphoric acid, and organic acids such as acetic acid, gluconic acid, fumaric acid, malic acid and citric acid.

9. A food product prepared with the edible material of claim 5.

* * * * *